US006277448B2

(12) United States Patent
Strutt et al.

(10) Patent No.: US 6,277,448 B2
(45) Date of Patent: Aug. 21, 2001

(54) THERMAL SPRAY METHOD FOR THE FORMATION OF NANOSTRUCTURED COATINGS

(75) Inventors: Peter R. Strutt, Storrs, CT (US); Bernard H. Kear, Piscataway, NJ (US); Ross F. Boland, West Hartford, CT (US)

(73) Assignees: Rutgers the State University of New Jersey, Piscataway, NJ (US); University of Connecticut, Storrs, CT (US)

( * ) Notice: Subject to any disclaimer, the term of this patent is extended or adjusted under 35 U.S.C. 154(b) by 0 days.

(21) Appl. No.: 09/325,822

(22) Filed: Jun. 4, 1999

Related U.S. Application Data

(62) Division of application No. 09/019,061, filed on Feb. 5, 1998, now Pat. No. 6,025,034, which is a continuation of application No. 08/558,133, filed on Nov. 13, 1995, now abandoned.

(51) Int. Cl.[7] .................................................. C23C 4/12
(52) U.S. Cl. ..................... 427/452; 427/446; 427/447; 427/600; 427/565; 427/568; 427/576; 427/577; 427/578; 427/579
(58) Field of Search .................................. 427/446, 447, 427/452, 600, 576, 577, 578, 579, 565, 568

(56) References Cited

U.S. PATENT DOCUMENTS

| 3,419,415 | 12/1968 | Dittrich . |
|---|---|---|
| 3,617,358 | 11/1971 | Dittrich . |
| 4,746,468 | 5/1988 | Ozaki et al. . |
| 4,982,067 | 1/1991 | Marantz et al. . |
| 5,155,071 | 10/1992 | Jacobson . |
| 5,213,851 | 5/1993 | Snyder et al. . |
| 5,609,921 | 3/1997 | Gitzhofer et al. . |
| 5,688,565 | 11/1997 | McMillan et al. . |
| 5,863,604 | 1/1999 | Hunt et al. . |
| 5,874,134 | * 2/1999 | Rao et al. .............................. 427/446 |

FOREIGN PATENT DOCUMENTS

| 0 665 266 A2 | 2/1995 | (EP) . |
|---|---|---|
| 63-121647 | 5/1988 | (JP) . |
| WO 95/10491 | 4/1995 | (WO) . |

OTHER PUBLICATIONS

Chen, et al. "Effects of Additives in Electrospraying for Materials Preparation" *Journal of the European Ceramic Society*, pp. 1439–1443 (1998) Great Britian (no month date).

Correa–Lozano, et al. "Physicochemical Properties of SnO2–Sb2O5 Films Prepared by the Spray Pyrolysis Technique" *Journal of the Electrochemical Society*, pp. 203–209 Jan. (1996) New Hampshire (no month date).

Hull, et al. "Synthesis of Nanometer–Scale Silver Crystallites via a Room–Temperature Electrostatic Spraying Process" *Advanced Materials* pp. 413–417 (1997) (no month date).

Lopez, et al. "Spray Pyrolysis Deposition of Sn2S3 Thin Films" *Semicond. Sci. Technol.* pp. 433–436 (1996) United Kingdom (no month date).

Vieu, "Gold Nanograins Deposited from a Liquid Metal Ion Source" *Microelectronic Engineering* pp. 349–352 (1997) (no month date).

* cited by examiner

*Primary Examiner*—Katherine A. Bareford
(74) *Attorney, Agent, or Firm*—Cantor Colburn LLP

(57) ABSTRACT

This invention relates to methods whereby nanoparticle precursor solutions are used in conventional thermal spray deposition for the fabrication of high-quality nanostructured coatings. The method allows combining nanoparticle synthesis, melting, and quenching into a single operation.

8 Claims, 3 Drawing Sheets

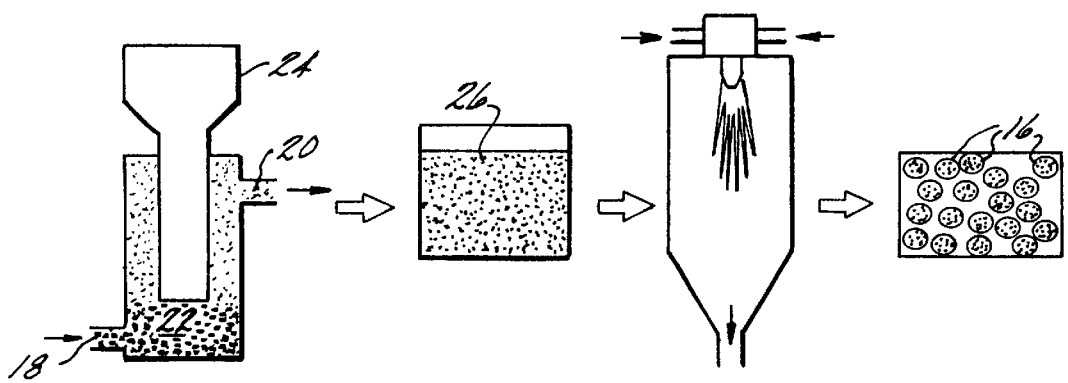
*FIG. 2*
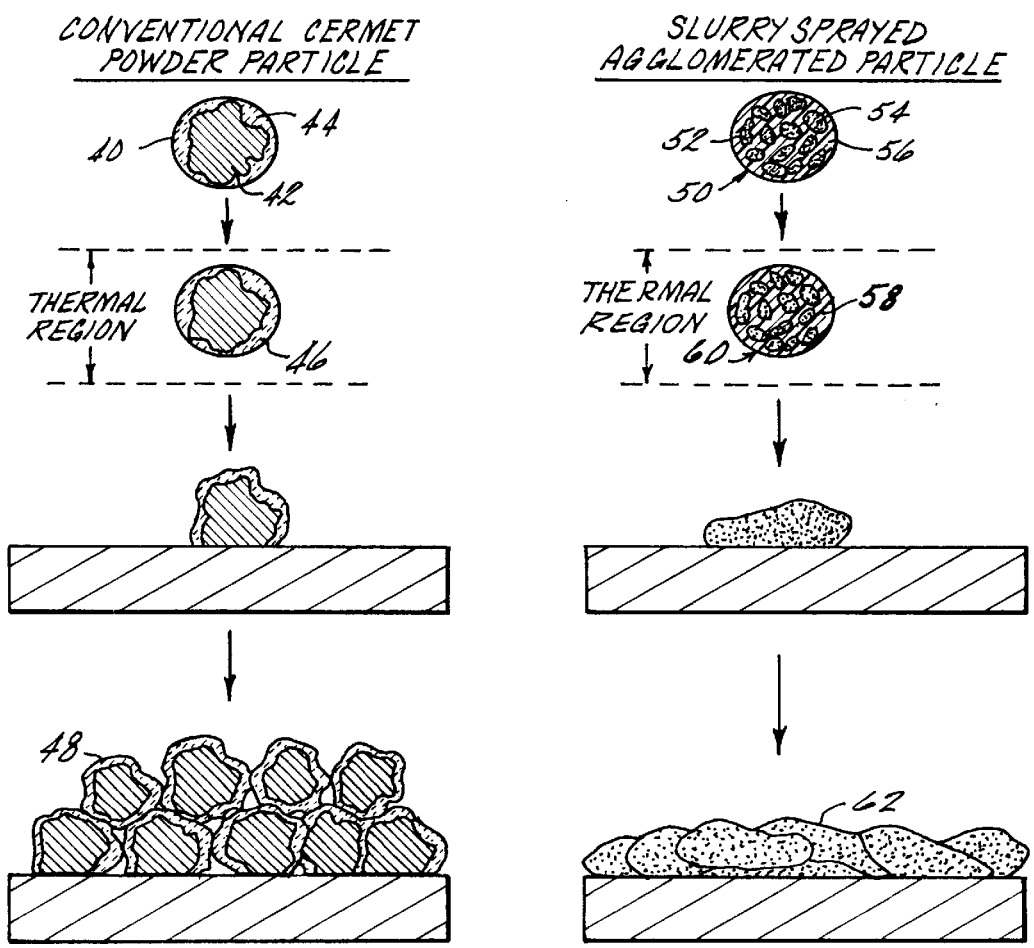
*FIG. 4A*
*(PRIOR ART)*
*FIG. 4B*

THERMAL SPRAY METHOD FOR THE FORMATION OF NANOSTRUCTURED COATINGS

CROSS REFERENCE TO RELATED APPLICATION

This application is a divisional of U.S. application Ser. No. 09/019,061, filed Feb. 5, 1998, now U.S. Pat. No. 6,025,034 which is a continuation of U.S. application Ser. No. 08/558,133, filed Nov. 13, 1995, now abandoned, all of which are incorporated herein by reference.

BACKGROUND OF THE INVENTION

1. Field of the Invention

This invention relates generally to the field of nanostructured materials. In particular, this invention relates to nanostructured feeds used in the deposition of high-quality nanostructured coatings via the thermal spraying process.

2. Brief Description of the Prior Art

Materials with fine-scale microstructures have long been recognized to exhibit technologically attractive properties. In the past few years, a new class of sub-microstructured materials has been identified, composed of ultra fine grains or particles. These materials have been referred to as "nanostructured materials." Nanostructured materials are characterized by having a high fraction of the material's atoms residing at grain or particle boundaries. For example, with a grain size in the five nanometer range, about one-half of the atoms in a nanocrystalline or a nanophase solid reside at grain or particle interfaces.

Although research in the field of nanostructured materials currently focuses on synthesis and processing of nanostructured bulk materials, there is a growing interest in nanostructured coatings, including thermal barrier, hard and superhard coatings. Nanostructured bulk materials with designed multifunctional coatings present unprecedented opportunities for advances in materials properties and performance for a broad range of structural applications.

Research on nanostructured materials has been a major activity at Rutgers University and the University of Connecticut since the late 1980's. Progress has been made in the synthesis of (1) nanostructured metal powders by the organic solution reaction (OSR) and aqueous solution reaction (ASR) method, (2) nanostructured ceramic-metal (cermet) powders by the spray conversion processing (SCP) method, and (3) nanostructured powders by the gas condensation processing method. Advances have also been made in the consolidation of nanostructured powders by solid and liquid phase sintering methods (for bulk materials) while preserving the desirable nanostructures.

There are three different methods currently in use for the synthesis of nanostructured powders, including (1) the organic solution reaction (OSR) and aqueous solution reaction (ASR) methods for synthesizing nanostructured metal powders, for example, nanostructured $Cr_3C_2$/Ni powders; (2) the spray conversion processing (SCP) method for synthesizing nanostructured cermet powders, for example, tungsten-carbon/cobalt and $Fe_3Mo_3C$/Fe powders; and (3) the gas condensation processing (GCP) method for synthesizing nanostructured ceramic powders, for example, titanium dioxide, zirconium dioxide and silicon/carbon/nitrogen.

The OSR and ASR methods for the preparation of nanostructured metals and alloys use three steps: (1) preparation of an organic or aqueous solution of mixed metal chlorides; (2) reductive decomposition of the starting solution with a metal hydride to obtain a colloidal solution of the metallic constituents,; and (3) filtering, washing and drying, followed by gas-phase carburization under controlled carbon and oxygen activity conditions to form the desired nanodispersion of carbide phases in a metallic matrix phase.

This procedure has been used to synthesize a variety of nanostructured metal/carbide powders, including nanostructured $Cr_3C_2$/NiCr powders for use in thermal spraying of corrosion resistant hard coatings. A small amount of an organic passivation agent, such as a solution of paraffin in hexane added to the final wash provides protection of the high surface area powder against spontaneous combustion when dried and exposed to air. The as-synthesized powders thus produced are loosely agglomerated. As used herein, the term agglomerated also encompasses aggregated particles.

The SCP method for synthesizing nanostructured cermet composite powders involves three sequential steps: (1) preparation of an aqueous solution mixture of salts of constituent elements; (2) spray drying of the starting solution to form a homogeneous precursor powder; and (3) fluid bed conversion (reduction and carburization) of the precursor powder to the desired nanostructured cermet powder. The SCP method has been utilized to prepare nanostructured WC/Co, nanostructured $Fe_3Mo_3C$/Fe and similar cermet materials. The particles may be in the form of hollow spherical shells. The powders are usually passivated after synthesis in order to avoid excessive oxidation when exposed to air.

The GCP method is the most versatile process in use today for synthesizing experimental quantities of nanostructured metal and ceramic powders. A feature of the process is its ability to generate loosely agglomerated nanostructured powders, which are sinterable at relatively low temperatures.

In the inert gas condensation (IGC) version of the GCP method, an evaporative source is used to generate the powder particles, which are convectively transported to and collected on a cold substrate. The nanoparticles develop in a thermalizing zone just above the evaporative source, due to interactions between the hot vapor species and the much colder inert gas atoms (typically 1–20 mbar pressure) in the chamber. Ceramic powders are usually produced by a two-stage process: evaporation of a metal source, or preferably a metal suboxide of high vapor pressure, followed by slow oxidation to develop the desired nanostructured ceramic powder particles.

In the chemical vapor condensation (CVC) version of the GCP method, a hot-wall tubular reactor is used to decompose a precursor/carrier gas to form a continuous stream of clusters or nanoparticles exiting the reactor tube. Critical to the success of CVC processing are: (1) a low concentration of precursor in the carrier gas; (2) rapid expansion of the gas stream through the uniformly heated tubular reactor; (3) rapid quenching of the gas phase nucleated clusters or nanoparticles as they exit from the reactor tube; and (4) a low pressure in the reaction chamber.

The resulting nanostructured ceramic powder particles are loosely agglomerated, as in the IGC method, and display low temperature sinterability. This is in contrast to the ultra fine powders produced by conventional ambient pressure combustion flame and arc-plasma powder processing methods, which yield cemented aggregates that can be consolidated only at much higher sintering temperatures. The CVC method has been used to synthesize nanostructured powders of a variety of ceramic materials, which cannot easily be produced by the IGC process, because of their high melting points and/or low vapor pressures. Examples are nanostructured $SiC_xN_y$ powders, for which there are many suitable metalorganic precursors, such as hexamethyldisilazane (HMDS). The actual composition of the resulting powder is strongly influenced by the choice of carrier gas. Thus, $HMDS/H_2O$, $HMDS/H_2$ and $HMDS/NH_3$ give nanostructured ceramic powders with compositions close to $SiO_2$, SiC and $Si_3N_4$, respectively.

In current industrial practice, the powders used to deposit metal, ceramic or composite coatings by thermal spray or plasma deposition consist of particles in the range form 5 to 50 microns in diameter. During the short residence time in the flame or plasma, the particles are rapidly heated to form a spray of partially or completely melted droplets. The large impact forces created as these particle arrive at the substrate surface promote strong particle-substrate adhesion and the formation of a dense coating of almost any desired material, with the coatings ranging in thickness from 25 microns to several millimeters, and formed at relatively high deposition rates.

Generally, the conventional powders used in thermal spray coating are produced by a series of steps, involving ball milling, mechanical blending, high temperature reaction, and occasionally spray drying using a binder. Powder delivery systems in thermal spray technology are designed to work with powder agglomerates with particle size in the range from 5 to 25 microns. The minimum size of the constituent grains or particles in conventional powders is in the range of 1 to 0.5 microns. In contrast, in nanostructured materials, the size of the constituent grains or particles is in the range from 1 to 100 nanometers. As-synthesized nanoparticle powders are thus generally unsuitable for conventional thermal spray coating, and need to be reprocessed in order to satisfy the size requirements of conventional spray technology. Accordingly, there remains a need for methods of re-processing as-synthesized powders so that they are suitable for conventional commercial spray deposition. Alternatively, there remains a need for allowing reliable, inexpensive high-throughput direct injection of an as-synthesized powder, or chemical precursor for in-situ particle synthesis into the thermal spray apparatus in order to achieve reproducible, high-quality deposition of nanostructured coatings.

SUMMARY OF THE INVENTION

The above-discussed and other problems and deficiencies of the prior art are overcome or alleviated by the methods of the present invention, which for the first time allow the production of nanoparticle feeds suitable for use with conventional thermal spray technology.

Accordingly, in one embodiment of the present invention, there is provided a method for reprocessing as-synthesized nanoparticle powders to an aggregated form suitable for conventional spray deposition of nanostructured coatings, wherein the assynthesized powders are first dispersed in a liquid medium by means of ultrasound, then spray dried. These spray dried agglomerated nanostructured powders have a spherical shape and narrow particle size distribution in the optimal 10–50 micron range. These powders therefore have superior feed characteristics in thermal spraying and also experience uniform melting behavior in the combustion flame or plasma. As a consequence, the coatings display uniform nanostructures, negligible porosity, good substrate adhesion and excellent wear properties. In contrast to powders mixed by ball milling or mechanical blending, for example, the method of this invention allows mixing of the material's constituent elements at a molecular level.

In an alternative embodiment of the present invention, there is provided a method for direct nanoparticle injection of as-synthesized powders into the combustion flame or plasma of a conventional thermal spray deposition device, wherein the as-synthesized powders are first dispersed in a liquid medium by means of ultrasound. Direct injection by this method allows reproducible deposition of high-quality nanostructured coatings without an intermediate re-processing step. The very short diffusion distance allows fast reactions to occur between nanoparticles and the vapor species in the gas stream, for example, carburization, nitridation, and boridization. This embodiment also allows the constituents of a given material to be mixed at a molecular level.

In yet another embodiment of the present invention, there is provided a method for the manufacture of nanostructured coatings using a metalorganic aerosol feedstock generated ultrasonically, wherein nanoparticle synthesis, melting and quenching are performed in a single operation.

The above-mentioned and other features and advantages of the present invention will be appreciated and understood by those skilled in the art from the following detailed description and drawings

BRIEF DESCRIPTION OF THE DRAWINGS

Referring now to the drawings wherein like elements are numbered alike in the several FIGURES:

FIG. 2 is a detailed flow diagram of the method of the present invention for reprocessing as-synthesized nanostructured powders;

FIGS. 4A and 4B are diagrams comparing thermal spraying of conventional cermet powder particles and agglomerated cermet powder particles of the present invention;

DESCRIPTON OF THE PREFERRED EMBODIMENT

Figure 1:
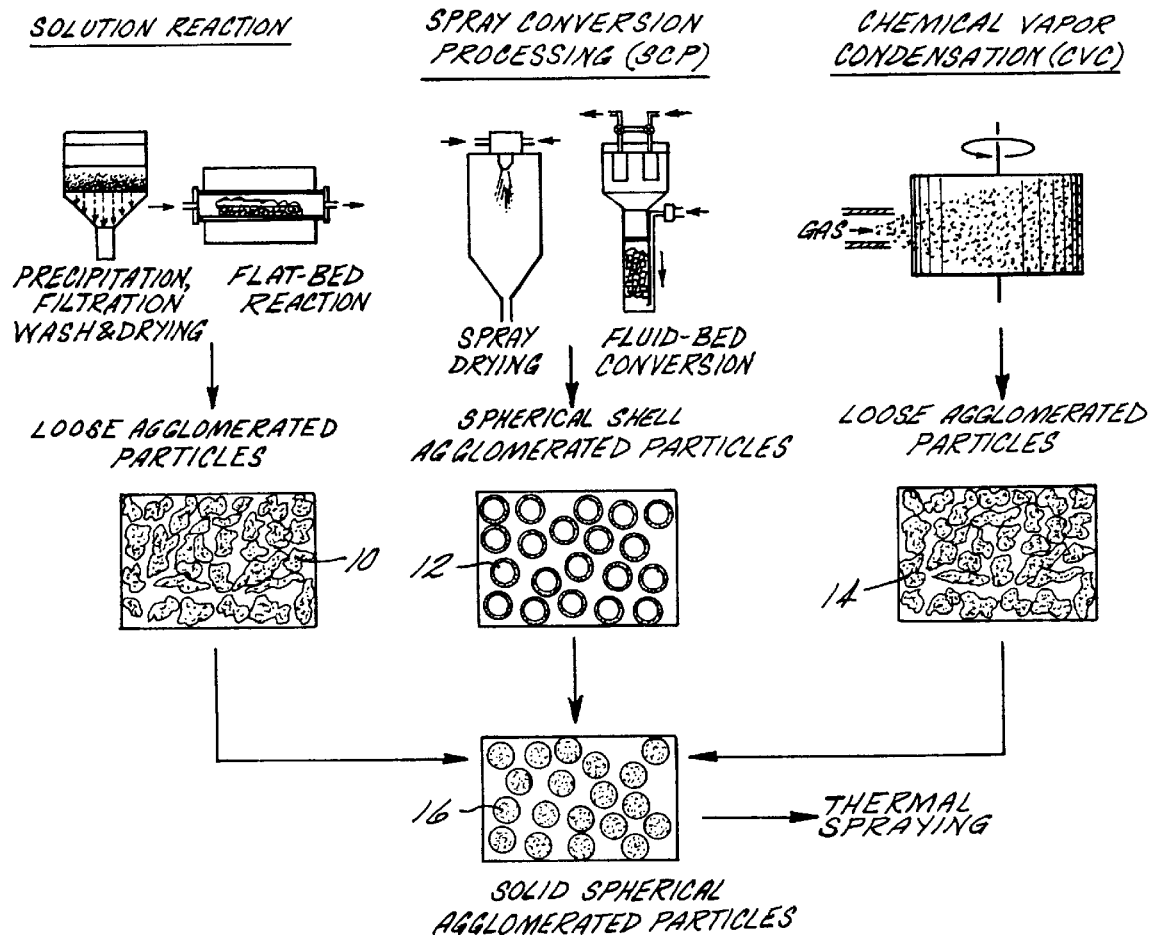
FIG. 1 is a flow diagram of the examples of the synthesis of agglomerated nanostructured powders for use in thermal spray coating, including the method of the present invention for reprocessing as-synthesized powders.
Figure 5:
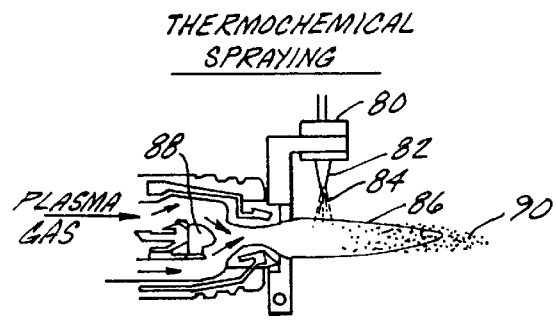
FIG. 5 is a depiction of the method of the present invention for the manufacture of nanostructured coatings using a metalorganic aerosol feedstock generated ultrasonically.

Referring now to FIGS. 1 and 2, in one embodiment of the present invention, there is provided a method for reprocessing nanoparticle powders to an agglomerated form suitable for thermal spray deposition of nanostructured coatings. According to this method, as-synthesized nanostructured powders 10, 12 and 14 are ultrasonically disintegrated and dispersed in a liquid medium, and then spray-dried to form spherical nanoparticle agglomerates 16 suitable for thermal spray deposition. The original particles, typically less than 50 microns, can be reduced to submicron dimensions, forming a viscous slurry or a colloidal suspension within minutes. While nanoparticles 10 synthesized via the solution reaction (OSR or ASR) method, nanoparticles 12 synthesized via the SCP method, or nanoparticles 14 synthesized via the CVC method are each suitable for reprocessing by the method of the present invention, it is to be understood that nanoparticles synthesized by any method are suitable for use in the present invention. In addition, while the agglomerated nanoparticle powders are particularly useful for thermal spray deposition, they may also find utility in other applications requiring agglomerated nanoparticles.

In the practice of the method of this embodiment, an as-synthesized powder which may comprise the particles 10, 12, 14 or a mixture thereof is first suspended in a liquid medium to form suspension 18. The liquid medium may be aqueous-based or organic-based, depending on the desired characteristics of the final agglomerated powder. Suitable organic solvents include, but are not limited to, toluene, kerosene, methanol, ethanol, isopropyl alcohol, acetone and the like.

The medium is then treated with ultrasound to disperse the nanostructured material, forming dispersion 20. The ultrasonic dispersal effect is most pronounced in the cavitation zone 22 at the tip of the ultrasonic horn 24. The nanostructured powder may be merely dispersed in solution, or it may form a colloidal suspension, typically within minutes.

A binder is also added to the solution, forming mixture 26. In organic-based liquid mediums, the binder comprises from about 5% to about 15% by weight, and preferably about 10% by weight of paraffin dissolved in a suitable organic solvent. Suitable organic solvents include, but are not limited to, hexane, pentane, toluene and the like. In aqueous-based liquid mediums, the binder comprises an emulsion of commercially available polyvinyl alcohol (PVA), polyvinylpyrrolidone (PVP), carboxymethyl cellulose (CMC), or some other water soluble polymer, formed in deionized water. The binder is present in the range from about 0.5% to about 5% by weight of the total solution, and preferably from about 1% to about 10% by weight of the total solution. The preferred binder is CMC.

After mechanical mixing and if required further ultrasound treatment the suspension of nanostructured powder in the liquid medium 26 is spray-dried in hot air to form agglomerated particles 16. While any suitable non-reactive gas or mixture thereof may be used, hot nitrogen or hot argon is preferred. Because there is no requirement for the treatment of exhaust gases from the spray drier using aqueous-based liquid mediums, these are preferred where possible.

After spraying, powders 16 are heat-treated at low temperatures (<250° C.) to expel residual moisture, leaving the organic component (polymer or paraffin) as a binder phase. If necessary, a further heat treatment step at a high temperature effective to remove adsorbed and chemisorbed oxygen and to promote partial sintering may be added. For example, heat treatment at about 600° C. is effective. The resulting powder may then be used in conventional thermal spray deposition processes. The following non-limiting examples illustrate the method of re-processing as-synthesized nanostructured powders using ultrasonic dispersion.

EXAMPLE 1

Typical processing conditions for preparing nanostructured WC/Co powder agglomerates are as follows. Nanostructured WC/Co, prepared by means well-known in the art, is formed into an approximately 50 wt % solution in de-ionized and deoxygenated water. An ultrasonic horn, operating at a frequency of 20,000 Hertz and power of 300–400 watts, is used to disperse the nanostructured WC/Co to form a low viscosity slurry. With this energy input, original as-synthesized hollow spherical shell particles of 10–50 micron diameter are rapidly disintegrated and dispersed in the fluid medium, forming a dispersed phase of particle size of about 100 nm. Subsequently, 5–10 wt % carbon black and a 2–3% by weight solution of PVP in deionized, deoxygenated water are added to the suspension. Carbon black is optionally added to compensate for the carbon loss of WC particles by high reaction in the flame or plasma. CMC is also suitable for use with WC/Co materials.

Figure 3:
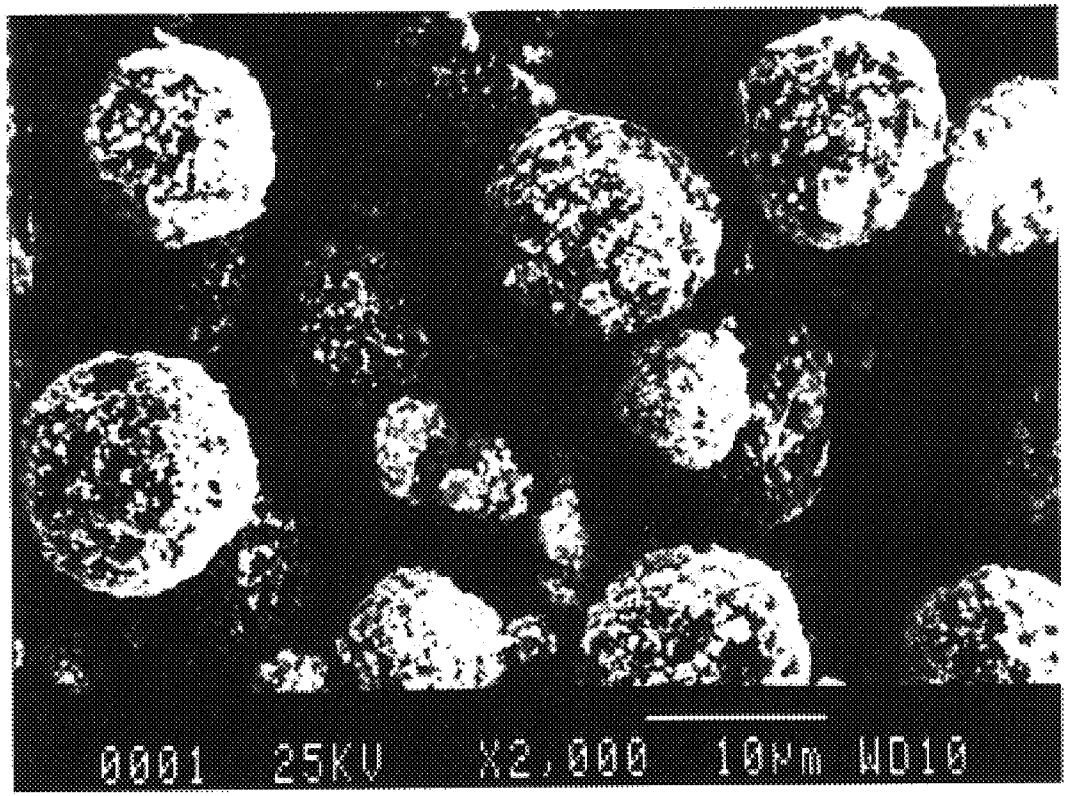
FIG. 3 is a scanning electron micrograph of a WC/Co nanostructured powder produced by the reprocessing method of the present invention.

After mixing and further ultrasonic treatment, the slurry is spray-dried in a commercial unit to form a powder consisting of solid spherical particles with a mean diameter in the 5–20 micron range as shown in FIG. 3. Finally, it is preferable to clean the powders after agglomeration by a low temperature de-gassing treatment under reduced pressure prior to back filling with dry nitrogen. The powders can then be stored indefinitely in nitrogen without degradation.

Because of the high surface area of the nanostructured WC/Co powder agglomerates, there is the potential for in-situ decarburization within the agglomerates, due to the presence of oxygen or oxygen-rich species. To eliminate this problem it is preferable to introduce a passivation treatment at some stage in the powder processing using a suitable oxygen-free compound, such as paraffin. The paraffin is chemisorbed on the high surface area nanoparticles. Preferably, the paraffin is introduced in a hexane solution (5–10% by weight).

The high velocity oxy-fuel (HVOF) process is ideally suited for depositing nanostructured cermet coatings, because of the relatively low flame temperature and short particle transit time, which minimizes deleterious reactions in the flame.

A feature of using cermet nanostructured powders such as WC/Co reprocessed by the method of the present invention is the homogeneous melting of the matrix (binder) phase upon thermal spray coating, with the formation of semi-solid or "mushy" particles. Referring now to FIGS. 4A and 4B, a conventional powder particle 40 contains a hard particle phase 42 surrounded by a solid matrix phase 44. In the thermal region of the spray apparatus, the solid matrix phase 44 becomes a molten matrix phase 46. Thus, in a conventional cermet powder particle 40 the large (5–25 micron diameter) carbide grain 42 undergoes little size change in the thermal region, because of the finite time for heat transfer during the 1 millisecond transit time between exiting the gun nozzle and impact with substrate. The coatings 48 formed by these particles may therefore be porous.

In contrast, the agglomerated cermet powder particles 50 of the present invention contain hard particles 52, with a grain size in the range from about 5 to about 50 nanometers, within a matrix phase 54, agglomerated by binder 56. During thermal spraying, the small size of the carbide grains 52 of the agglomerated nanostructured particles 50 allow the particles to rapidly dissolve in the molten matrix 58 to produce a "mushy" cermet particle 60. This mushy particle 60 will readily flow upon impact with the substrate to form a highly adherent dense coating with low porosity 62. The degree of fluidity of the impacting particle can be controlled by selecting the degree of superheat above the eutectic point of the impacting particles. Additionally, a high impact velocity of the mushy nanostructured cermet particles facilitates improved spreading and adhesion to the substrate surface.

EXAMPLE 2

Nanostructured $Cr_3C_2$/NiCr powders produced by the ASR and OSR methods are in the form of loose agglomerates of variable size and morphology. Using the above general procedure, these powders can be ultrasonically dispersed in an aqueous or organic liquid medium with a polymer or paraffin binder and spray dried to form uniform-sized spherical agglomerates of 5–25 microns diameter. Moreover, during thermal spraying, the nanocomposite powders experience partial melting and undergo splat quenching when they impact the substrate surface. This behavior is similar to that described for nanostructured WC/Co powders.

EXAMPLE 3

Nanostructured $SiO_2$ powders may be produced by combustion flame synthesis, a commercial process. The as-synthesized powder has a high surface area (>400 $m^2$/gm), and is in the form of hard agglomerates known as "cemented aggregates," with up to 10–100 nanoparticles per aggregate. Such powders can be readily dispersed in an aqueous solution because they are inherently hydrophilic. The resulting colloidal suspension, containing PVA, PVP or CMC as a binder, can then be converted into spherical agglomerates by spray-drying, as discussed above. The behavior in thermal spraying, however, is different since the $SiO_2$ particles experience softening rather than melting.

The spray-dried agglomerated nanostructured powders described in the above examples have a spherical shape and narrow particle size distribution in the optimal 10–50 micron range. As such, they have superior feed characteristics in thermal spraying and also experience uniform melting behavior in the combustion flame or plasma, and the coatings formed therefrom display uniform nanostructures, negligible porosity, good substrate adhesion and excellent wear properties. In particular, coatings formed by this method from cermet materials such as WC/Co, $Cr_3C_2$/Ni, $Fe_3Mo_3C$/Fe have novel nanostructures comprising a nanodispersion of hard carbide phase in an amorphous or nanocrystalline metal-rich matrix phase, thereby displaying superior hardness and wear resistance.

In an alternative embodiment of this invention, nanostructured powder feeds are introduced into a thermal spray system directly after ultrasound dispersion. Suitable as-synthesized nanostructured powders for the practice of this invention are those produced by any physical method, such as GCP, or by chemical processing methods, such as the IGC and CVC methods. Such powders are monodispersed and loosely agglomerated. Particle size is easily controlled over the range 3–30 nanometer range by careful adjustments of certain critical processing parameters known in the art. These loosely agglomerated powders can be readily dispersed in de-ionized water, various alcohols or liquid hydrocarbons by ultrasonic agitation to form a colloidal suspension or slurry. This nanoparticle suspension or slurry can then be introduced, along with liquid kerosene fuel, directly into the combustion zone of an HVOF gun via the liquid feed. Alternatively, the suspension or slurry may be introduced in the form of an aerosol into the gas feed of a plasma or HVOF gun.

Characteristics of this embodiment are that the particles rapidly heat up in a short distance from the gun nozzle and almost instantaneously achieve the velocity of the gas stream, which is in the supersonic range. In some cases, the nanoparticles vaporize, prior to condensation on the cold substrate. In this case, the method becomes in effect a very high rate CVD process.

Where applicable for an individual composition, direct nanoparticle injection by this method offers a number of advantages. First, it eliminates the need for powder reprocessing. Secondly, two or more nanoparticle feed systems, operating continuously or sequentially, can produce nano-multilayers or compositionally modulated structures, even down to nanoscale dimensions. Thirdly, the dispersion may be done in the same liquid used as the fuel for the thermal spray apparatus, e.g., kerosene. And finally, because of the short diffusion distances, very fast reactions occur between nanoparticles and the vapor species in the gas stream (e.g., carburization, nitridation and boridization).

The direct injection method may also be used to incorporate ceramic nanostructured whiskers, hollow shells and other particulate forms into the nanocomposite coating. Hollow ceramic microspheres (1–5 microns diameter) are available commercially. More generally, mixtures of different phases and particle morphologies may be used to generate almost any desired coating structure, including whisker-reinforced and laminated nanocomposites.

The simplicity, versatility, and scaleability of the direct nanoparticles injection method thus presents opportunities to develop new classes of thermal sprayed nanostructured coatings. Moreover, because direct injection in thermal spray apparatuses can be adapted to existing thermal spray systems, it is inherently cost effective. The following non-limiting examples illustrate the method of this embodiment for injection of as-synthesized nanostructured powders directly after ultrasonic dispersion.

EXAMPLE 4

Nanostructured $ZrO_2$, $Al_2O_3$, $SiO_2$ and $SiC_xN_y$ powders produced by the CVC method, or nanostructured $Cr_3C_2$/NiCr produced by the OSR process, are readily dispersed in organic liquid media to form colloidal suspensions, because of their ultra-fine particle size. Thus, these materials are ideal for direct injection of nanoparticles into the fluid stream of a typical thermal spray gun. High density coatings with amorphous and partially amorphous structures were produced from nanostructured $SiO_2$ and nanostructured $Cr_3C_2$/NiCr powders respectively.

EXAMPLE 5

Submicron nanostructured WC/Co particles can be maintained in a highly dispersed state in a liquid phase after ultrasonic treatment provided that mechanical agitation is continuously applied. Thus, it is not necessary to form completely stable colloidal suspensions with nanostructured WC/Co powders. The coatings produced by subsequent direct injection into the combustion zone of a thermal spray gun are similar to those generated using powder agglomerates as feed materials.

EXAMPLE 6

The direct injection method was used to spray-deposit nanostructured yttria-stabilized zirconia (YSZ) coatings on pre-oxidized metal-CrAlY substrates. The coatings are preferentially compositionally graded to minimize thermal expansion mismatch stresses, which is a prerequisite to enhancing their resistance to spallation under thermal cycling conditions.

EXAMPLE 7

A novel type of thermal barrier coating (TBC) may be produced by introducing hollow ceramic microspheres into a nanostructured YSZ overlay coating, which is supported on a metal-CrAlY bond coat. Alternatively, the ceramic microspheres may be incorporated into the metal-CrAlY bond coat. In this case, a high volume fraction of microspheres is required to ensure a high thermal impedance for the coating layer.

EXAMPLE 8

When a slurry mixture of ceramic nanoparticles and hollow microspheres is introduced into a combustion flame or plasma, it is possible to selectively melt the nanoparticles while leaving the microspheres unmelted. Thus, a composite coating is developed in which the hollow ceramic spheres are bonded to the substrate by a dense nanograined ceramic coating.

Thermal barrier coatings of nanostructured YSZ may be prepared by either the reprocessing method or by the direct injection method. In either case, the final coating may consist of either equiaxed or columnar grains, depending primarily on the particle deposition rate and temperature gradient in the deposited coating.

In yet another embodiment of this invention, metalorganic precursor aerosols generated by an ultrasonic nozzle serve as feedstock materials for thermal spraying processing. This offers the advantage of combining of nanoparticle synthesis, melting and quenching in a single operation. Referring now to FIG. 5, liquid precursor 80 is introduced into ultrasonic nozzle 82. The nozzle sprays the resulting aerosol (atomized liquied prescursor) 84 into a plasma flame 86, generated by the passage of plasma gas over electrode 88, yielding nanoparticles 90, which may then be quenched on a substrate. For example, the metalorganic precursor hexamethyldisilazane (HMDS) was ultrasonically atomized in air and delivered to the exit nozzle of a DC plasma gun. Rapid pyrolysis of the precursor compound led to the formation of clusters or nanoparticles of nanostructured $SiC_xN_y$, which emerged as a high velocity beam from the gun. The coating formed when these hot particles impinged and coalesced on the substrate surface.

The nanostructured coatings formed by the methods of this invention find utility in a broad range of applications. In particular, nanostructured coatings formed from hydroxyapatite or vitellium are useful in medical devices. The coatings display uniform nanostructures, negligible porosity, good substrate adhesion and excellent wear properties. In contrast to powders mixed by ball milling or mechanical blending, for example, the method of this invention allows mixing of the material's constituent elements at a molecular level. The very short diffusion distance in the direct injection embodiment allows fast reactions to occur between nanoparticles and the vapor species in the gas stream, for example, carburization, nitridation, and boridization.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for forming a nanostructured coating comprising (a) atomizing a liquid precursor;

(b) delivering the atomized liquid precursor to a plasma flame of a thermal spray device, thereby forming nanoparticles; and (c) delivering the formed nanoparticles to a substrate, thereby forming a nanostructured coating on the substrate.

2. The method of claim 1, wherein the liquid precursor is a metalorganic feedstock.

3. The method of claim 2, wherein the metalorganic feedstock is hexamethyldisilazane.

4. The method of claim 2, wherein the coating is $SiC_xN_y$.

5. A method for forming a nanostructured coating comprising (a) atomizing a liquid precursor;

(b) delivering the atomized liquid precursor to a plasma flame in a thermal spray device;

(c) forming nanoparticles from the liquid precursor within the plasma flame; and (d) delivering the formed nanoparticles to a substrate, thereby forming a nanostructured coating on the substrate.

6. The method of claim 5, wherein the liquid precursor is a metalorganic feedstock.

7. The method of claim 6, wherein the metalorganic feedstock is hexamethyldisilazane.

8. The method of claim 6, wherein the formed coating is $SiC_xN_y$.

* * * * *

UNITED STATES PATENT AND TRADEMARK OFFICE
CERTIFICATE OF CORRECTION

PATENT NO.   : 6,277,448 B2
DATED        : August 21, 2001
INVENTOR(S)  : Peter R. Strutt et al.

It is certified that error appears in the above-identified patent and that said Letters Patent is hereby corrected as shown below:

Column 1,
Line 12, insert -- STATEMENT REGARDING FEDERALLY SPONSORED RESEACH AND DEVELOPMENT. This invention was made with Government support under grant N00011-91-J-1828 awarded by the Office of Navel Research. The Government has certain rights in the invention. --

Signed and Sealed this

Thirtieth Day of March, 2004

JON W. DUDAS
*Acting Director of the United States Patent and Trademark Office*